Oct. 22, 1968    D. I. LIVINGSTON ET AL    3,406,566
PUNCTURE STRENGTH TESTER
Filed Sept. 25, 1964
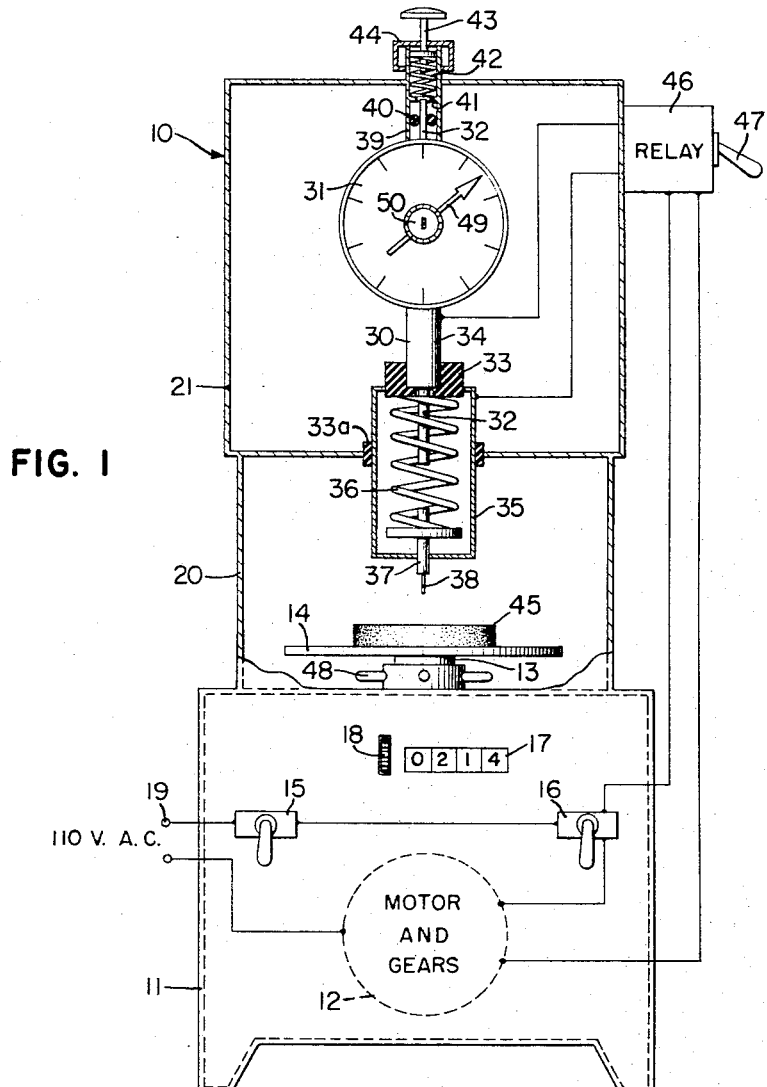
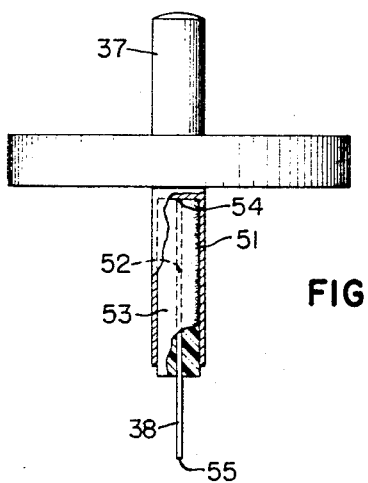
FIG. 2
INVENTOR.
DANIEL I. LIVINGSTON
SAMUEL D. GEHMAN
*J.B. Holden*
ATTORNEY

United States Patent Office 3,406,566
Patented Oct. 22, 1968

3,406,566
PUNCTURE STRENGTH TESTER
Daniel I. Livingston and Samuel D. Gehman, Akron, Ohio, assignors to The Goodyear Tire & Rubber Company, Akron, Ohio, a corporation of Ohio
Filed Sept. 25, 1964, Ser. No. 399,188
7 Claims. (Cl. 73—81)

ABSTRACT OF THE DISCLOSURE

Testing apparatus for moving a specimen of elastic polymeric rubbery or rubber-like materials into puncturing engagement with a small straight round stiff spring loaded indenter, with dial indicators showing the puncturing force on the indenter and the distance of its penetration at the instant of internal rupture within the specimen under the indenter, an electrical circuit energizing motor driven movement is disconnected at the instant of rupture, so as to determine rupture strength of the material.

---

This invention relates to a method and apparatus useful in determining the physical properties of polymeric materials and in particular relates to the use of a puncture producing indenter.

Heretofore reliance has been placed upon various tensile tests for the determination of stress-strain and ultimate strength properties of polymeric materials in order to maintain quality standards and, in conjunction with other tests, a judgment of quality and a prediction of service behavior. In order to perform a satisfactory tensile test, a specimen is required that has a definite form which generally is cut from a molded sheet rather than from a part of the fabricated article. Often the geometry and size of a finished article is such that it is inconvenient and sometimes practically impossible to acquire a tensile sample therefrom. There is also the distinct possibility that laboratory test specimens may not have properties which are identical with those of the production article. It is therefore very desirable to be able to have a test procedure that can be performed upon finished articles or small specimens cut from them.

Indentation tests are widely used to determine the hardness of highly elastic materials such as rubbers and various forms of plastics. The indentation tests are simple, rapid, and can usually be made directly on the fabricated article. In many instances the indentation test is nondestructive. For example, such a test can be performed on the thread of an automobile tire without detrimental effect.

Many of the hardness or durometer tests, employing variously shaped indenters, measure essentially the modulus, or stress-strain behavior exhibited under the particular test conditions. It has been observed that when an indenter such as that used in durometer hardness measurements is applied to a highly elastic material such as rubber the force required to continue penetration of the stylus increases, drops briefly, and then follows a variable course. An examination of a specimen that has undergone such a test reveals that the drop in load occurred at the time that the specimen was permanently punctured. Such a test provides a means of determining the stress-strain properties of the test specimen and also gives an indication of the ultimate strength and ultimate indentation of the test specimen.

The primary object of this invention is to provide a new and novel apparatus useful in determining physical properties of polymeric material.

Another object of this invention is to perform a test that is for most practical purposes not destructive to the object being tested.

An additional object of this invention is to provide a compact portable test instrument.

A further object of the present invention is to provide a test instrument that does not require the exercise of load judgment on the part of the operator.

Additional other objects and advantages of the present invention will be apparent from the accompanying description when taken in conjunction with the drawings wherein:

FIGURE 1 shows schematically the puncture testing instrument,
FIGURE 2 shows an enlarged view of the indenter holder partly in section.

FIGURE 1 shows a schematic view of the puncture testing apparatus of this invention. The entire assembly is shown generally at 10. The assembly or framework has a lower section 11 that contains a motor and gears 12 utilized in raising and lowering support column 13 upon which specimen platform 14 is mounted. The motor and gears are of conventional design and have not been shown other than schematically in the drawing. Lower section 11 also has mounted thereon a power switch 15 and a toggle or operating switch 16. A revolution counter dial 17 is visibly mounted on lower section 11. Also included is a zero reset knob 18 for resetting the revolution counter 17. Power source terminals 19 protrude from lower section 11 and are adapted for coupling with any convenient power source.

A center or yoke section 20 is mounted on top of lower section 11. Center section 20 provides a rigid vertical framework to which is attached upper section 21. Upper section 21 contains a dynamometer assembly 30 in axial alignment with support column 13. Assembly 30 contains a dial gage 31 that has been reworked so that the gage spindle 32, which protrudes from both top and bottom, is no longer spring biased. Spindle 32 will not return to a zero setting when a force is removed therefrom. A suitable electrical insulator block 33 is attached to the end of gage spindle housing 34. A spring housing cylinder 35 is attached to insulator block 33 and mounted concentrically with respect to gage spindle 32. Additional insulation may be provided as shown at 33a. A calibrated compression spring 36 is positioned around gage spindle 32 and within housing cylinder 35. An indenter holder 37 is positioned within cylinder 35 so that it is biased downwardly by the spring 36 one end of which bears against it. The indenter holder 37 protrudes downwardly from cylinder 35 and contains an indenter 38 that is aligned perpendicular with respect to the surface of platform 14. As explained before gage spindle 32 extends through dial gage 31 so that one end projects at the top of gage 31. The top portion of spindle 32 is housed in cylinder 39 which is attached to gage 31. An O-ring 40 is placed around spindle 32 so that it is in contact therewith and also in contact with the inside surface of cylinder 39. A suitable spring rest 41 is rigidly positioned within cylinder 39. A compression spring 42 is held against the shoulder of rest 41 and biased against reset plunger 43 which is held in place by cap 44.

A more complete understanding of the invention will be evident from the following explanation of how a specimen is tested. To perform a test the line power is turned on by means of power switch 15 which is shown at the left side of lower section 11. A test specimen such as 45 is placed on platform 14. Reset plunger 43 is pushed downward thus engaging the upper end of gage spindle 32. Gage spindle 32 is forced downward until the lower end thereof contacts the upper end of indenter holder 37. The lower end of gage spindle 32 and the upper end of indenter holder 37 are conditioned to make an electrical contact when they are in abutting relationship with one another thus permitting current to flow through relay 46 and hence to spring housing cylinder 35 which is in electrical contact with indenter holder 37. The current flows through the abutting juncture between indenter holder 37 and gage spindle 32 and then through gage spindle housing 34 back to relay 46. Insulators 33 and 33a prevent an electrical short from occurring between cylinder 35 and gage spindle housing 34. Switch 47 on relay 46 is in closed position. Relay 46 is of conventional design and need not be discussed herein. A spring loaded operating switch 16 is moved to an upward position and the circuit is completed through relay 46 back to motor assembly 12 which in turn powers a conventional gear train (not shown) that raises support column 13 to which is attached specimen platform 14. Operating switch 16 is held in the up position while specimen 45 is advanced toward indenter 38. The specimen 45 is stopped short of the indenter and the platform is raised manually by fine adjustment 48 until test specimen 45 just touches the lower end of indenter 38. This can be best judged by the presence of a very slight resistance to sliding of the specimen between the platform and the indenter. Revolution counter 17 is then set so that it is at zero by means of counter zero set wheel 18. A lubricant such as silicone grease is applied to the tip of indenter 38. The upward motion of platform 14 is ready to commence since the revolution counter 17 has been zeroed as well as the dial gage 31 which was zeroed when reset plunger 43 was depressed in order to move gage spindle down in contact with indenter holder 37.

Operating switch 16 is held in the up position and the indenter 38 is permitted to indent rising specimen 45. An indentation is produced in the specimen until the point of indenter 38 finally rupture the specimen. At the time of rupture the load is momentarily reduced hence calibrated spring 36 elongates thus causing disengagement of gage spindle 32 which is held by the friction of O-ring 40 from indenter holder 37. The separation of the electrical contacts formed by the ends of 32 and 37 breaks the electrical circuit and causes relay 46 to stop motor 12. The puncture strength is then obtained to approximately one hundredth of a pound from the reading of dial gage 31. Dial gage 31 shows a direct correlation between its reading and the force required to compress spring 36. The puncture strength value can thus be obtained from a calibration curve or a simple equation. The puncture depth can also be easily obtained since it is the difference between the counter reading and the dial gage reading. The counter reading can be correlated to the vertical movement of platform 14.

An additional method of detecting the load at rupture can be employed. Instead of utilizing the separation of electrical contacts to activate relay 46 as heretofore described, an electrical transducer in the form of a strain-gage or a differential transformer can be used to convert the indentation force into a measurable electrical quantity. In this manner the electrical relay can be operated thus stopping the drive mechanism coupled to the specimen platform. An electromechanical device can be used to monitor the increasing load, as the indenter indents the specimen.

After indenter 38 has punctured specimen 45, platform 14 is lowered by holding operating switch 16 in the down position. The specimen is held against the surface of platform 14 so that indenter 38 can be extricated. Silicone grease is reapplied to the tip of the indenter 38 and the specimen is moved so as to bring a new area in alignment with the indenter, the reset plunger 43 is depressed, and the platform 14 is elevated for the next puncture test. It is usually unnecessary to readjust revolution counter 17 to zero for subsequent punctures on a small, molded specimen because the thickness usually does not vary more than a thousandth of an inch, however, a zero setting may be made when it is necessary.

The skilled operator has no difficulty in determining just when the indenter 38 is touching the top of specimen 45 prior to the commencement of the puncture, however, another completely objective way to find the zero level is to paint a band of conductive ink around the sample from top to the bottom surface. Relay switch 47 is moved to normally open position. Dial gage pointer 49 is turned clockwise a small amount by means of knob 50 that protrudes from its face. The rotation of knob 50 raises gage spindle 32 thus breaking the electrical contact between the end of gage spindle 32 and indenter holder 37. The platform 14 is then raised by moving operating switch 16 to the up position. When indenter 38 just contacts the conductive ink on the top surface of the specimen, the relay 46 will stop motor 12. The top surface of platform 14 is connected to ground as is relay 46 hence the completion of the circuit required to stop motor 12 when indenter 38 makes electrical contact with the top of the ink covered specimen. The counter 17 may then be zeroed and relay switch 47 can be moved to the normally closed position. Also reset plunger 43 can be depressed in order to make the required electrical contact between gage spindle 32 and indenter holder 37. It is often desirable to have indenter 38 enter the specimen other than at the point where the conductive ink was placed. This can be accomplished by moving the specimen slightly in a lateral direction. When numerous puncture tests are desired a grid of conductive ink may be stamped on the specimen so that the zero position may be checked at a spot adjacent to each puncture test.

The apparatus of this invention may also be used to measure the hardness of rubberlike substances. The relay switch 47 is moved to the normally open position. The dial gage pointer is set by means of knob 50 to a predetermined force. The test specimen is then raised by platform 14 until it pushes indenter 38 and indenter holder 37 into electrical contact with pre-positioned gage spindle 32. When the electrical connection is made relay 46 will immediately stop motor 12. The difference between the counter 17 reading and the gage 31 reading is the indentation for a given force. A measurement may also be made of creep by continuing to hold operating switch 16 up, whereupon the revolution counter 17 will advance intermittently as the sample is driven up to maintain the given load.

FIGURE 2 shows a side view, a portion of which is in section, of indenter holder 37. Since indenters of small diameter are prone to break after some use it has been discovered that indenters made from straightened music wire are more durable than those made from carbon steel such as drill rod. Indenter 38 as shown in FIGURE 2 is mounted in a cylindrical plug of semi-rigid material such as Teflon which is a polymeric compound of tetrafluoroethylene sold by the Du Pont Company. In this manner the Teflon will yield slightly with lateral movement of the indenter thus avoiding the high bending stresses that would be inherent at the base of a rigidly cantilevered indenter. The Teflon plug is set in a cylindrical recess 51 drilled in the end of indenter holder 37. Indenter 38 is positioned in a centrally drilled hole 52 that passes axially through plug 53. In this manner indenter 38 can contact the metallic portion of indenter holder 37 as at 54. The metal to metal contact is necessary since indenter 38 provides part of the electrical circuit as heretofore set forth. The end 55 of indenter 38 is squared off so that it is normal to the longitudinal axis of the indenter. The surface is then polished with the edges being deliberately rounded slightly so that the load drop on failure will be great enough to actuate the stopping mechanism. The overall diameter of indenter 38 is approximately 0.014 inch.

One of the most valuable applications of the above described invention is in the area of quality control. The apparatus provides an ultimate strength test that in many instances can be performed upon an article going into service, returned from service, or undergoing service testing because in many applications the micro-punctures are essentially non-destructive. Such products upon which a nondestructive test would be beneficial are tires, belts, shoes, and hose, and many other articles, including those made from plastics.

While certain representative embodiments and details have been shown for the purpose of illustrating the invention, it will be apparent to those skilled in this art that various changes and modifications may be made therein without departing from the spirit or scope of the invention.

What is claimed is:

1. A testing apparatus adapted for determining the physical properties of highly elastic materials, comprising a housing structure including a lower section, a midsection attached to and extending upward from the lower section, and an upper section attached to the midsection so that it is remote from the lower section, an electrical inlet and control means mounted on the housing structure, a specimen platform movably mounted and activated by a driving means located in the lower section, a fine adjustment means for controlling the movement of the platform indepedent of the drive means, first indicator means connected to the drive means so that the amount of travel of the platform can be sensed, a dynamometer means mounted axially with respect to the direction of movement of the platform, said dynamometer means having a calibrated energy storage means coupled with a second indicator means and an indenter holder, a pair of electrical contacts formed by an extension of the second indicator means and the indenter holder, an indenter needle resiliently positioned within the indenter holder, a restraining means coupled with the second indicator means to prevent free movement thereof, reset means coupled with the second indicator means so that electrical contact can be made between the second indicator means and the indenter holder, and electrical relay means electrically connected to the control means, the driving means, and the dynamometer means so as to stop the movement of the platform when the indenter needle ruptures a specimen mounted on the platform.

2. A testing apparatus as claimed in claim 1 wherein the calibrated energy storage means is a helical spring.

3. A testing apparatus as claimed in claim 1 wherein the indenter is partially embedded in a plastic material contained within the indenter holder.

4. A puncture strength testing apparatus for determining physical properties of highly elastic materials, comprising a rigid housing structure having a lower section including a mounting base, a midsection attached to and extending upward from the lower section, and an upper section attached to the midsection so that it is remote from the lower section; an electrical inlet and control switches mounted on the lower section, a specimen platform mounted such that it can be raised and lowered by a screw arrangement that is coupled to a driving mechanism located within the confinees of the lower section, a fine adjustment mechanically connected to the specimen platform so that it can be raised and lowered independent of the driving mechanism, a revolution counter and reset control visibly mounted and connected to the drive mechanism so that there is direct correlation between the counter and the linear movement of the specimen platform; a dynamometer assembly mounted on said top section so that the axis of said dynamometer is parallel to the direction of motion of the specimen platform, said dynamometer comprising a dial indicator having a spindle extending axially from the top and bottom of the dial indicator housing, a calibrated compression spring concentrically encompassing the spindle portion extending from the bottom of the dial indicator housing, an indenter holder biased by the calibrated spring, a pair of electrical contacts formed by the lower end of the spindle and the indenter holder, an indenter needle resiliently positioned within the indenter holder, a friction restraining ring positioned in contact with the upper portion of the spindle so as to prevent free movement of the spindle, a spring-biased reset plunger mounted axially with respect to the upper end of the spindle so that contact can be made between the lower end of the spindle and the indenter holder, a relay attached to the housing structure and electrically connected to the motor control and dynamometer assembly to stop the motor when the indenter has ruptured a specimen mounted on the platform.

5. An apparatus for determining physical properties of elastic polymeric materials comprising an indenter movable in one direction and in a second direction, means for biasing said indenter in said one direction, means for indicating the force exerted by said biasing means, a distance measuring device movable independently of and relatively with respect to said indenter, a platform having a specimen receiving surface mounted perpendicular to said one direction, said device being operatively connected with said indenter and said platform so as to measure relative movement between said indenter and platform, means for effecting relative movement of one of said platform and said indenter, and means actuated in response to movement in said one direction of said indenter for detecting a reduction in force in the biasing means due to rupture within a specimen under the indenter, whereby both the force and the distance of penetration at the event of rupture can be indicated.

6. An apparatus for determining the physical properties of elastic polymeric materials comprising an indenter movable in one direction and in a second direction, means for biasing said indenter in said one direction, a dynamometer means movable independently of and relative to said indenter, said dynamometer means being drivingly connectable to said indenter for movement therewith in said second direction, restraining means for preventing idle movement of said dynamometer means in said one direction, and an electrical circuit having contact means closed by contact and opened by separation between said dynamometer means and said indenter to actuate said electrical circuit.

7. An apparatus for determining physical properties of polymeric elastic materials, which properties are related to penetration force and penetration distance at the event of rupture of such material under an indenter, comprising a housing, a platform having a specimen receiving surface mounted on said housing for movement along an axis perpendicular to said surface, driving means in said housing operatively connected with said platform to provide said movement, an indenter of straightened wire having a small end face substantially equal in area to its cross-section area mounted perpendicularly to said surface for limited movement along said axis toward and away from said platform during movement thereof, a spring device for biasing said indenter toward said platform, indicator means mounted on said housing and drivingly engageable with said indenter to respond to movement thereof in a direction opposed to the bias of said device and to record the maximum extent of said movement, and electrical circuit means actuated by movement separating said indenter from said indicator means at the event of rupture within a specimen of said material under the indenter and operative to stop said driving means.

References Cited
UNITED STATES PATENTS

| | | | |
|---|---|---|---|
| 2,804,769 | 9/1957 | Clark | 73—81 |
| 3,309,916 | 3/1967 | Pearson | 73—81 |
| 1,768,512 | 6/1930 | De Leeuw | 73—81 |
| 2,699,540 | 1/1955 | Hunter | 73—81 |
| 2,839,917 | 6/1958 | Webster | 73—81 |
| 3,138,951 | 6/1964 | Scott | 73—81 |
| 3,160,002 | 12/1964 | Lovette | 73—102 |

RICHARD C. QUEISSER, *Primary Examiner.*

C. IRVIN McCLELLAND, *Assistant Examiner.*

Washington, D.C. 20231

UNITED STATES PATENT OFFICE
CERTIFICATE OF CORRECTION

Patent No. 3,406,566                            October 22, 1968

Daniel I. Livingston et al.

It is certified that error appears in the above identified patent and that said Letters Patent are hereby corrected as shown below:

Column 1, after line 20, insert the following as a new paragraph:--The foregoing abstract is not to be taken as limiting the invention of this application, and in order to understand the full nature and extent of the technical disclosure of this application, reference must be made to the accompanying drawing and the following detailed description. --; line 48, "thread" should read -- tread --. Column 3, line 29, "rupture" should read -- ruptures --. Column 5, line 52, "confinees" should read -- confines --.

Signed and sealed this 3rd day of March 1970.

(SEAL)
Attest:

Edward M. Fletcher, Jr.                  WILLIAM E. SCHUYLER, JR.

Attesting Officer                          Commissioner of Patents